(12) United States Patent
Suau et al.

(10) Patent No.: US 8,895,630 B2
(45) Date of Patent: *Nov. 25, 2014

(54) NON-IONIC ASSOCIATIVE THICKENERS CONTAINING ALKYL CYCLOHEXYLOLS, FORMULATIONS CONTAINING THEM AND THEIR USES

(75) Inventors: Jean-Marc Suau, Lucenay (FR); Denis Ruhlmann, Genay (FR)

(73) Assignee: Coatex, Genay (FR)

( * ) Notice: Subject to any disclaimer, the term of this patent is extended or adjusted under 35 U.S.C. 154(b) by 57 days.

This patent is subject to a terminal disclaimer.

(21) Appl. No.: 13/495,080

(22) Filed: Jun. 13, 2012

(65) Prior Publication Data

US 2012/0322896 A1 Dec. 20, 2012

Related U.S. Application Data

(60) Provisional application No. 61/497,117, filed on Jun. 15, 2011.

(30) Foreign Application Priority Data

Jun. 14, 2011 (FR) ..................................... 11 55156

(51) Int. Cl.
| | |
|---|---|
| *A61K 47/30* | (2006.01) |
| *C08L 75/08* | (2006.01) |
| *C08G 18/75* | (2006.01) |
| *C09D 7/00* | (2006.01) |
| *C08G 18/48* | (2006.01) |
| *C08G 18/28* | (2006.01) |

(52) U.S. Cl.
CPC ............. *C08G 18/2825* (2013.01); *C08L 75/08* (2013.01); *C08G 18/755* (2013.01); *C09D 7/002* (2013.01); *C08G 18/4833* (2013.01)

USPC ........................................................ 514/772.3

(58) Field of Classification Search
None
See application file for complete search history.

(56) References Cited

U.S. PATENT DOCUMENTS

| | | | |
|---|---|---|---|
| 5,916,967 A * | 6/1999 | Jones et al. ................... 524/732 |
| 6,111,146 A | 8/2000 | Rayborn | |
| 2002/0183442 A1 | 12/2002 | Wamprecht et al. | |
| 2003/0050388 A1 | 3/2003 | Strickland et al. | |
| 2005/0187342 A1 | 8/2005 | Schieferstein et al. | |
| 2011/0060101 A1 | 3/2011 | Suau et al. | |

FOREIGN PATENT DOCUMENTS

| WO | WO 99/11594 | 3/1999 |
|---|---|---|
| WO | WO 03/022947 A1 | 3/2003 |
| WO | WO 2011/030197 A2 | 3/2011 |

OTHER PUBLICATIONS

U.S. Appl. No. 13/495,115, filed Jun. 13, 2012, Suau, et al.
International Search Report issued Oct. 2, 2012 in Application No. PCT/FR2012/051315 (With English Translation of Category of Cited Documents).

* cited by examiner

*Primary Examiner* — Craig Ricci
(74) *Attorney, Agent, or Firm* — Oblon, Spivak, McClelland, Maier & Neustadt, L.L.P.

(57) ABSTRACT

New associative thickeners of the HEUR type (Hydrophobically modified Ethylene oxide URethane) whose hydrophobic monomer is based on alkyl cyclohexylols. These are new polyurethanes that allow a broad thickening of a medium shear gradient aqueous formulation while limiting the increase in the low shear gradient viscosity. The invention also concerns the compositions containing them and their uses in different formulations such as aqueous paints.

16 Claims, No Drawings

NON-IONIC ASSOCIATIVE THICKENERS CONTAINING ALKYL CYCLOHEXYLOLS, FORMULATIONS CONTAINING THEM AND THEIR USES

REFERENCE TO PRIOR APPLICATIONS

This application claims priority to U.S. provisional application Ser. No. 61/497,117, filed Jun. 15, 2011; and to French patent application 11 55156, filed Jun. 14, 2011, both incorporated herein by reference.

GENERAL FIELD

One object of the present invention concerns new associative thickeners belonging to the HEUR (Hydrophobically modified Ethylene oxide URethane) category. Used in aqueous formulations, they enable an increase in the average shear gradient viscosity while limiting the increase in low shear gradient viscosity. Such a compromise is believed to result from the use of original groups based on alkyl cyclohexylols to manufacture the associative monomers of these thickeners.

Additional objects, advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND

Aqueous paint formulations containing mineral fillers generally consist of an aqueous phase, of one or more polymers in emulsion in the liquid phase referred to as binders. fillers and/or pigments, a dispersant and admixtures as diverse as surfactants, coalescent agents, biocides, and anti-foaming agents, and finally, at least one thickening agent.

The latter allows a control of the rheology of aqueous formulations in which it is introduced, and in particular in aqueous paints, both at the manufacturing stage as well as during their transport, storage, or in the course of their implementation. The diversity of practical constraints at the level of each of these steps reflects a multiplicity of different rheological behaviours.

One can nevertheless summarize the need of the person skilled in the art to obtain a thickening effect in the aqueous formulation, both for reasons of stability over time as well as for a possible application of paint to a vertical surface, the absence of coating splash at the time of implementation, etc. This is why the additives which contribute to this control of rheological behaviour are known as thickeners.

Among these products, there are the so-called "associative" thickeners which are water-soluble polymers with insoluble hydrophobic groups. Such macro-molecules have an associative character: once introduced into water, the hydrophobic groups are susceptible to association in the form of micellar aggregates. These aggregates are linked to one another by the hydrophilic parts of the polymers: there is then the formation of a three-dimensional network that causes the increase in the viscosity of the medium.

The operating mechanism and characteristics of associative thickeners are well known today and are described for example in the documents "Rheology modifiers for waterborne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these associative thickeners, there is the class of associative thickeners of the HEUR (Hydrophobically modified Ethylene oxide URethane) type. They designate copolymers resulting from the synthesis between a compound of the polyalkylene glycol type, a polyisocyanate and a monomer or condensate called "associative" of the alkyl, aryl or aryalkyl type consisting of a hydrophobic terminal group.

These structures are well known for developing high viscosities for an average to low shear gradient (j. of Applied Polymer Science, vol. 58, p 209-230, 1995; Polymeric Mat. Sci. and Engineering, vol. 59, p 1033, 1988; Polymeric Mat. Sci. and Engineering, vol. 61, p 533, 1989; Polymeric Paint Colour Journal, vol. 176, No. 4169, p 459, June 1986), which corresponds respectively to Stormer™ (KU) and Brookfield™ (mPa·s) measurements of viscosity.

But it is a more complex rheology that we are seeking, a real compromise between the application properties of the paint and its behaviour in the can. On the one hand, we aim to increase the Stormer™ viscosity of the formulation: this results in a better stability of the paint in storage and an improved performance when the product is agitated (appearance in the can) and is picked up with the application tool (better loading of the roller, paintbrush or brush). On the other hand, the increase in the Brookfield™ viscosity must be limited in a concomitant manner: such an increase results in a degradation of the application properties of the paint (limitation of levelling, presence of coating splashes).

To this double problem, the associative polyurethane thickeners market provided a solution in the 1990s which constitutes a reference: Acrysol™ SCT-275 (DOW™) However, this product contains alkyl phenols. Now these substances are today widely suspected of being carcinogenic and dangerous to reproduction. Still tolerated in the paint industry, they nonetheless remain of interest to legislative institutions, particularly those of Europe.

There is therefore a real need to develop an associative thickener of the HEUR type in order to resolve the double technical problem referred to above without using alkyl phenols. In order to do so, the person skilled in the art has a very broad library of structures that differ essentially in the choice of the hydrophobic monomer.

Document EP 1 566 393 describes a HEUR type thickener, one of the essential characteristic of which is the presence of n-butyl-1-octanol, while its hydrophobic groups are based on fatty alcohols with 8 to 18 carbon atoms. Document DE 10 206 023001 describes an associative non-ionic thickening agent of the HEUR type including a branched linear alcohol. Document EP 1 241 198 describes polyurethane-based thickening agents including a monoalcohol having 6 to 22 carbon atoms. Document EP 1 013 264 describes a polyurethane thickener for cosmetic formulations with an associative monomer functionalized by a hydrophobic group that can be linear or branched, but preferentially linear and possessing 12 to 24 carbon atoms. Document WO 94/06840 proposes an associative thickener of the HEUR type characterized by a certain density of hydrophobic groups, the said groups being linear alkyl chains with 8 to 22 carbon atoms. Document EP 1 584 331 proposes a hydrophobic terminal group with 6 to 34 carbon atoms for the associative monomer. To specifically increase the Brookfield™ viscosity, document EP 0 639 595 proposes linear hydrophobic groups having 4 to 36 carbon atoms. Document WO 02/102868 also makes reference to linear structures for the associative monomer.

However, outside of the alkyl phenols, none of the hydrophobic structures envisaged until now provides satisfaction for increasing the Stormer™ viscosity while limiting the increase in the Brookfield™ viscosity, and thus achieving an optimal compromise between stability on the one hand, the can appearance, the tool loading, and on the other hand the application properties such as levelling and the absence of coating splash.

DETAILED DESCRIPTION

The inventors have found quite surprisingly that the use of certain structures instead of the hydrophobic monomer led to a better compromise between a significant Stormer™ viscosity and an attenuated Brookfield™ viscosity, and this for a number of carbon atoms that was identical or close to the linear alkyl structures of the prior art.

This technological advance is based on the use, as a hydrophobic monomer, of a compound whose structure corresponds to formula (I):

where R designates an alkyl group with 10 to 15 carbon atoms. Such compounds have been identified as surfactants and are obtained by hydrogenation of an alkyl phenol. In particular, reference can be made to document U.S. Pat. No. 6,111,146 which describes their synthesis. The resulting compounds are referred by the expression "alkyl cyclohexylols." It is important to note that the final structure is not that of an alkyl phenol, and that the resulting product will not be categorized as such.

These structures can be used to manufacture new water-soluble polyurethanes, for example by condensing:
a) a monomer of formula (I):

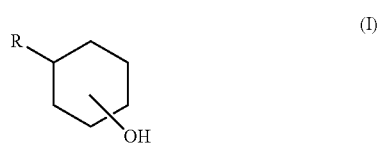

where R designates an alkyl group with 10 to 15 carbon atoms, preferentially 12 carbon atoms,
b) a polyalkylene glycol, and
c) a polyisocyanate.

It is these new polyurethanes that, for example, allow thickening of a medium shear gradient paint formulation while limiting this increase at a lower gradient, such a comparative being realised with linear alkyl structures of the prior art with a very similar number of carbon atoms. With the thickeners according to the invention, we even managed to exceed the performances of Acrysol™ SCT-275.

One object of the present invention is a water-soluble polyurethane resulting from the condensation:

a) of at least one monomer with the formula (I):

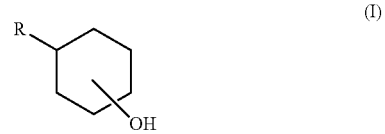

where R designates an alkyl group with 10 to 15 carbon atoms, preferentially 12 carbon atoms,
b) of at least one polyalkylene glycol, and
c) of at least one polyisocyanate.

"Polyurethane" is understood to mean a urethane polymer, i.e. a compound produced by the reaction between an isocyanate and an alcohol.

According to the invention, the term "alkyl" designates a linear or branched hydrocarbon radical with 10 to 15 carbon atoms, such as decyl, undecyl, dodecyl, tridecyl, tetradecyl or pentadecyl.

"Polyalkylene glycol" is understood to mean a polymer of an alkylene glycol derived from an olefinic oxide. The polyalkylene glycol according to the present invention is, for example, polyethylene glycol, polypropylene glycol, polybutylene glycol or a polyalkylene glycol containing a proportion of an ethylene-oxy group and/or a proportion of a propylene-oxy group and/or a proportion of a butylene-oxy group. The polyalkylene glycol according to the present invention can, for example, include a dominant proportion of an ethylene-oxy group in association with a secondary proportion of a propylene-oxy group. Specific examples of alkylene glycol polymers include: polyalkylene glycols having an average molecular weight of 1,000, 4,000, 6,000, 10,000 and 20,000 g/mol (in the case of polyethylene glycol called PEG-1000, PEG-4000, PEG-6000, PEG 10000 and PEG 20000); polyethylene polypropylene glycols having a percentage of ethylene oxide of between 20 and 80% by weight and a percentage of propylene oxide of between 20 and 80% by weight.

"Polyisocyanate" is understood to mean a compound which includes at least 2 functional isocyanate groups —N=C=O.

According to one aspect of the present invention, the monomer of formula (I) has the following formula (II):

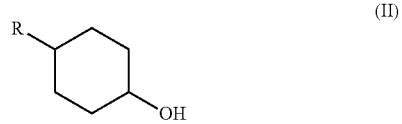

where R designates an alkyl group as defined above, i.e. having 10 to 15 carbon atoms, and preferably 12 carbon atoms.

According to another aspect of the present invention, monomer a) has a formula (I) or (II) where R designates a group having 12 carbon atoms. These polyurethanes belong to the HEUR type family of thickeners, and are capable of being made by a person skilled in the art using art-known techniques.

According to still another aspect of the present invention, monomer a) has a formula (I) or (II) where R designates a group having 15 carbon atoms.

According to one aspect of the present invention, the polyurethanes result from the condensation of:
a) 1% to 29% by weight of at least one monomer with the formula (I) or (II), and preferably 3% to 7% by weight, b) 70% to 98% by weight of at least one polyalkylene glycol, and preferably 86% to 94% by weight, and c) 1% to 29% by weight of at least one polyisocyanate, and preferably 3% to 7% by weight, where the sum of these mass percentages is equal to 100%.

According to another aspect of the present invention, the polyurethanes result from the condensation of two monofunctional alcohols, a polyalkylene glycol and a polyisocyanate. In this case, one of two monofunctional alcohols has a formula (I) or (II) where R designates an alkyl group having 10 to 15 carbon atoms, and preferably 12 or 15 carbon atoms, and the other monofunctional alcohol is of the aliphatic alcohol type, whether linear or branched, having between 6 et 20 carbon atoms, and preferably between 10 and 15 carbon atoms.

According to yet another aspect of the present invention, the polyurethanes result from the condensation of:

a) 1 to 29% by weight of a monomer of formula (I):

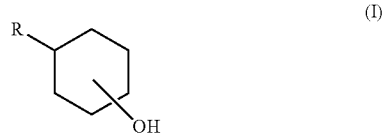

(I)

where R designates an alkyl group having between 10 and 15 carbon atoms, and preferably between 12 and 15 carbon atoms, b) 70% to 98% by weight of a polyalkylene glycol, c) 1% to 29% by weight of a polyisocyanate, and d) 1 to 29% by weight of an aliphatic alcohol having between 6 and 20 carbon atoms, and preferably between 10 and 15 carbon atoms, where the sum of these mass percentages is equal to 100%.

According to one aspect of the present invention, the polyurethanes result from the condensation notably of a polyalkylene glycol which is polyethylene glycol. This may relate, for example, to a polyethylene glycol the molecular mass of which varies between 2,000 g/mol and 20,000 g/mol, for example between 8,000 g/mol and 15,000 g/mol. As an example, polyethylene glycol of molecular mass 10,000 g/mol and 12,000 g/mol may be cited.

According to another aspect of the present invention, the polyurethanes result from the condensation notably of a polyisocyanate which is chosen from the group consisting of toluene diisocyanate, the toluene diisocyanate dimers and the toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane, a blend of 1-methyl-2,4-diisocyanatocyclohexane and 1-methyl-2,6-diisocyanatocyclohexane, the biuret of hexamethylene diisocyanate, the dimers of biuret of hexamethylene diisocyanate, the trimers of biuret of hexamethylene diisocyanate and a blend of at least two of these compounds.

A second object of the present invention relates to a method of preparing a polyurethane according to the invention, where the said method consists of a condensation of the various constituents of the polyurethane.

A third object of the present invention consists of an aqueous composition including a polyurethane according to the present invention.

According to one aspect of the invention, the said aqueous composition also includes water and at least one non-ionic surfactant. Thus, according to this aspect of the invention, the polyurethane is formulated in water in the presence of at least one non-ionic surfactant agent.

A "non-ionic surfactant" or "non-ionic surfactant agent" is understood to mean a non-ionic molecule consisting of at least a hydrophilic part and of at least a hydrophobic part.

According to one embodiment of the present invention, the said composition includes several surfactant agents, for example two, three or four.

According to another aspect of the present invention, the said aqueous composition also includes at least one additive selected from the group consisting of a biocide, a solvent, an anti-foaming agent, a pH regulator, a coalescent agent and their blends.

A "biocide" is understood to mean a chemical substance intended to destroy, repel or make harmless harmful organisms, to prevent their action, or to oppose them in any other manner, through a chemical or biological action.

An "anti-foaming agent" is understood to mean a substance or a formulation intended to destroy air bubbles within a homogenous or heterogeneous liquid medium (or at its surface), or to prevent their formation.

A "pH regulator" or "pH regulating agent" is understood to mean a chemical compound which enables the pH to be adjusted to the expected value. For example, the pH regulating agent can increase the pH; this is the case with bases, such as NaOH. Alternatively, the pH regulating agent can reduce the pH ; this is the case with acids.

A "coalescent agent" is understood to mean an agent used in paints which enables the Minimum Film Formation Temperature (MFFT) of paint to be reduced to a temperature suitable for the desired conditions of application (for example a TMFF of 5° C. for outside application). As an example of a coalescent agent according to the invention, propylene glycol, butyl glycol, 2,2,4-trimethyl-1,3-pentanediol monoisobutyrate or 2,2,4-trimethyl-1,3-pentanediol diisobutyrate may be cited.

According to yet another aspect, the aqueous composition of the present invention consists of:

1) 5% to 45% by weight of at least one polyurethane according to the invention, and preferably between 10 and 30% by weight, 2) 5% to 30% by weight of at least one surfactant, and preferably between 7 and 20% by weight, 3) 25% to 75% by weight of water, and 4) 0 to 5% by weight of at least one other additive chosen from the group consisting of a biocide, a solvent, an anti-foaming agent, a pH regulator, a coalescent agent, and their blends, where the sum of these mass percentages is equal to 100%.

According to yet another aspect, the aqueous composition of the present invention consists of a polyurethane as described above, a surfactant, water, a biocide and an anti-foaming agent.

According to another aspect of the invention, the aqueous composition consists of a blend of 5 to 45% by weight of at least one polyurethane as described above, 5 to 30% by weight of at least one surfactant, 25 to 75% by weight of water, 0.01 to 5% by weight of at least one biocide and 0.01 to 5% by weight of at least one anti-foaming agent.

A fourth object of the present invention relates to a method of preparation of an aqueous composition according to the invention, where the said method consists of blending different constituents of the aqueous composition.

A fifth object of the present invention consists of the use of a polyurethane according to the invention or an aqueous composition according to the invention to thicken an aqueous formulation, where the said formulation is selected from the group consisting of a paint, a lacquer, a varnish, a paper coating, a cosmetic formulation and a detergent formulation.

A sixth object of the present invention relates to an aqueous formulation including a polyurethane according to the invention or an aqueous composition according to the invention, where the said formulation is selected from the group consisting of a paint, a lacquer, a varnish, a paper coating, a cosmetic formulation and a detergent formulation.

According to one aspect of this object of the invention, the aqueous formulation is a paint and includes at least one dispersing agent, at least one mineral filler, at least one binder, at least one biocide, at least one anti-foaming agent, and possibly a coalescent agent.

A final object of the present invention relates to a method of preparation of an aqueous formulation according to the invention, where the said method consists of blending different constituents of the aqueous formulation.

The following examples allow a better understanding of the invention without however limiting its scope.

EXAMPLES

Example 1

This example describes a polyurethane according to the invention that uses a compound of formula (II) where R designates the linear alkyl group with 12 carbon atoms. We therefore have here a hydrophobic monomer of the alkyl cyclohexylol type with 18 carbon atoms.

At the same time, this example also illustrates 4 polyurethanes according to the prior art that use linear fatty alcohols with 12, 14, 16 and 18 carbon atoms.

This example describes a polyurethane apart from the invention that uses a compound of formula (II) where R designates the linear alkyl group with 9 carbon atoms. We therefore have here a hydrophobic monomer of the alkyl cyclohexylol type with 15 carbon atoms.

All the polyurethanes are products that are the result of the condensation, expressed in % by weight of each of the constituents, of 90% polyethylene glycol with a molecular mass by weight equal to 10,000 g/mol, of 5% of a monomer terminated by a hydrophobic group, the nature of which will be specified later, and of 5% of isophorone diisocyanate.

Finally, all these polyurethanes are formulated in water in the presence of a non-ionic surfactant (in this instance, a blend of commercially available branched alcoxylated C8 and C10 compounds) (ratio by weight: 30% polyurethane, 20% surfactant, 50% water).

An aqueous composition is obtained in this manner.

Test No. 1

This test illustrates a domain outside of the invention and corresponds to a formulation in water at 30% by dry weight of a polyurethane with a molecular mass by weight equal to approximately 11,000 g/mol where the hydrophobic monomer has the formula (II), where R designates the linear alkyl group with 9 carbon atoms.

Test No. 2

This test illustrates the invention and corresponds to a formulation in water at 30% by dry weight of a polyurethane with a molecular mass by weight equal to approximately 11,000 g/mol where the hydrophobic monomer has the formula (II), where R designates the linear alkyl group with 12 carbon atoms.

Test No. 3

This test illustrates the prior art and corresponds to a formulation in water at 30% by dry weight of a polyurethane with a molecular mass by weight equal to approximately 11,000 g/mol where the hydrophobic monomer is a linear alcohol with 12 carbon atoms marketed under the name Nacol™ 12-96 by the SASOL™ company.

Test No. 4

This test illustrates the prior art and corresponds to a formulation in water at 30% by dry weight of a polyurethane with a molecular mass by weight equal to approximately 11,000 g/mol where the hydrophobic monomer is a linear alcohol with 14 carbon atoms marketed under the name Nacol™ 14-98 by the SASOL™ company.

Test No. 5

This test illustrates the prior art and corresponds to a formulation in water at 30% by dry weight of a polyurethane with a molecular mass by weight equal to approximately 11,000 g/mol where the hydrophobic monomer is a linear alcohol with 16 carbon atoms marketed under the name Nacol™ 16-95 by the SASOL™ company.

Test No. 6

This test illustrates the prior art and corresponds to a formulation in water at 30% by dry weight of a polyurethane with a molecular mass by weight equal to approximately 11,000 g/mol where the hydrophobic monomer is a linear alcohol with 18 carbon atoms marketed under the name Nacol™ 18-98 by the SASOL™ company.

Test No. 7

This test demonstrates the prior art and uses Acrysol™ SCT-275 marketed by the DOW™ company, which is an aqueous solution at 17.5% by dry weight of an associative polyurethane containing alkyl phenols.

Example 2

This example demonstrates the use of polyurethanes according to the invention and the prior art as thickening agents for a flat paint.

The composition of the said paint is indicated in table 1, the mass of each constituent being indicated in grams.

The paint is formulated according to methods well known to the person skilled in the art.

In each test, 0.2% by dry weight of the polymer according to the invention is used in relation to the total weight of the paint formulation, i.e. approximately for 1 kg of formulation as defined below, 6.67 g of an aqueous composition as mentioned above.

TABLE 1

| Constituents | Mass (g) |
| --- | --- |
| Water | 190 |
| Ecodis ™ P50 (Coatex ™) | 4 |
| Acticide MBS (Thor ™) | 2 |
| Tego ™ 810 (Tego ™) | 1 |
| NaOH (20%) | 1 |
| Tiona ™ 568 (Millenium ™) | 80 |
| Durcal ™ 2 (Omya ™) | 300 |
| Omyacoat ™ 850 OG (Omya ™) | 220 |
| Acronal ™ 290 D (BASF ™) | 130 |
| Monopropylene glycol | 10 |
| Texanol ™ (Eastman ™) | 10 |
| Water | QS 1,000 |

The resulting viscosities are then determined at T=24 hours at 25° C., at low shear rate, Brookfield™ viscosity at 10 RPM, designated $\mu_{Bk10}$ (mPa·s), and at medium shear rate, Stormer viscosity, designated $\mu_S$ (KU).

TABLE 2

| Test No. | 1 | 2 | 3 | 4 | 5 | 6 | 7 |
|---|---|---|---|---|---|---|---|
| PA/IN | OI | IN | PA | PA | PA | PA | PA |
| Associative monomer | C15 | C18 | C12 | C14 | C16 | C18 | SCT-275 |
| $\mu_S$ (KU) | 102 | 128 | 96 | 106 | 125 | 116 | 119 |
| $\mu_{Bk10}$ (mPa·s) | 3,800 | 18,000 | 3,200 | 12,000 | 20,300 | 23,900 | 13,850 |

The results are shown in table 2.

It will be apparent to begin with that it is the polyurethane according to the invention (test No. 2) which leads to the highest Stormer™ viscosity.

At the level of the prior art, tests No. 3 and 4 lead to much lower Stormer™ viscosities. Tests No. 5 and 6 are the best placed from the viewpoint of medium shear rate; however, test No. 2 leads to a higher value, for a lower Brookfield™ viscosity.

As to Acrysol™ SCT-275 (test No. 7) which offers a very good compromise between low and medium gradient viscosity, it remains less efficient in terms of pure thickening efficiency compared to the invention.

Finally, test No. 1 demonstrates the importance of limiting the number of carbons in the hydrophobic monomer according to the invention. With only 15 carbon atoms, the polymer in test No. 1 is not effective enough in terms of pure thickening.

Example 3

This example demonstrates the use of polyurethanes according to the invention and the prior art as thickening agents for a flat paint.

The composition of the said paint is indicated in table 3, the mass of each constituent being indicated in grams.

The paint is formulated according to methods well known to the person skilled in the art. In each test, 0.36% by dry weight of the polymer according to the invention is used in relation to the total weight of the paint formulation.

TABLE 3

| Constituents | Mass (g) |
|---|---|
| Water | 277 |
| Ecodis ™ P50 (Coatex ™) | 4 |
| Acticide MBS (Thor ™) | 2 |
| Tego ™ Airex 901 W (Tego ™) | 1 |
| NaOH (20%) | 0.9 |
| Tiona ™ 568 (Millenium ™) | 81 |
| Durcal ™ 2 (Omya ™) | 300.1 |
| Omyacoat ™ 850 OG (Omya ™) | 133 |
| Mowilith LDM 1871 ™ (Celanese ™) | 150 |
| Tego ™ 825 (Tego ™) | 10 |
| Water | QS 1,000 |

The resulting viscosities are then determined at T=24 hours at 25° C., at low shear rate, Brookfield™ viscosity at 10 RPM, designated $\mu_{Bk10}$ (mPa·s), and at medium shear rate, Stormer viscosity, designated $\mu_S$ (KU).

TABLE 4

| Test No. | 1 | 2 | 3 | 4 | 5 | 6 | 7 |
|---|---|---|---|---|---|---|---|
| PA/IN | OI | IN | PA | PA | PA | PA | PA |
| associative monomer | C15 | C18 | C12 | C14 | C16 | C18 | SCT-275 |
| $\mu_S$ (KU) | 104 | 137 | 100 | 110 | 135 | 121 | 117 |
| $\mu_{Bk10}$ (mPa·s) | 10,200 | 25,000 | 8,800 | 20,000 | 36,000 | 45,000 | 17,100 |

The results are shown in table 4.

As was previously the case, it is the polyurethane according to the invention (test No. 2) which leads to the highest Stormer™ viscosity.

At the level of the prior art, tests No. 3 and 4 lead to lower Stormer™ viscosities. Tests No. 5 and 6 are then the best placed from the viewpoint of medium shear rate, but for a Brookfield™ viscosity that is much higher than that according to the invention.

As to Acrysol™ SCT-275 (test No. 7) which offers a very good compromise between low and medium gradient viscosity, it remains less efficient in terms of pure thickening efficiency compared to the invention.

Finally, test No. 1 which leads to a low thickening power demonstrates the interest in limiting the number of carbons in the hydrophobic monomer according to the invention.

As used herein the terms composed of, contains, containing, and terms similar thereto, when referring to the ingredients, parts, reactants, etc., of a composition, component, etc., mean, in their broadest sense, "includes at least" (i.e., comprises) but also include within their definition all those gradually restricted meanings until and including the point where only the enumerated materials are included (e.g., consisting essentially of and consisting of).

The above written description of the invention provides a manner and process of making and using it such that any person skilled in this art is enabled to make and use the same, this enablement being provided in particular for the subject matter of the appended claims, which make up a part of the original description.

As used herein, the phrases "selected from the group consisting of," "chosen from," and the like include mixtures of the specified materials. The term "mentioned" notes exemplary embodiments, and is not limiting to certain species. As used herein the words "a" and "an" and the like carry the meaning of "one or more."

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A water soluble polyurethane comprising, in reacted form:
a monomer of formula (I):

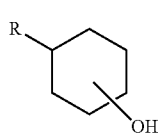 (I)

where R designates an alkyl group with 10 to 15 carbon atoms,
a polyalkylene glycol, and
a polyisocyanate.

2. The polyurethane according to claim 1, resulting from the condensation of:
a monomer of formula (I):

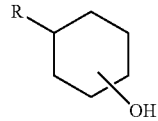 (I)

where R designates an alkyl group having 10 to 15 carbon atoms,
a polyalkylene glycol,
a polyisocyanate, and
an aliphatic alcohol having between 6 and 20 carbon atoms other than the monomer of formula (I).

3. The polyurethane according to claim 1, resulting from the condensation of:
a) 1% to 29% by weight of a monomer of formula (I),
b) 70% to 98% by weight of a polyalkylene glycol, and
c) 1% to 29% by weight of a polyisocyanate
where the sum of these mass percentages is equal to 100%.

4. The polyurethane according to claim 1, resulting from the condensation of
a) 3% to 7% by weight of a monomer of formula (I),
b) 86% to 94% by weight of a polyalkylene glycol, and
c) 3% to 7% by weight of a polyisocyanate
where the sum of these mass percentages is equal to 100%.

5. A polyurethane according to claim 1, where the polylakylene glycol is polyethylene glycol the molecular mass by weight of which is 2,000 g/mol-20,000 g/mol.

6. A polyurethane according to claim 1, where the polyisocyanate is chosen from the group consisting of toluene diisocyanate, the toluene diisocyanate dimers, the toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane, a blend of 1-methyl-2,4-diisocyanatocyclohexane and 1-methyl-2,6-diisocyanatocyclohexane, the biuret of hexamethylene diisocyanate, the dimers of the biuret of hexamethylene diisocyanate, the trimers of biuret of hexamethylene diisocyanate, and mixtures thereof.

7. The polyurethane according to claim 1, where R has 12 carbon atoms.

8. The polyurethane according to claim 1, resulting from the condensation of:
a) 1 to 29% by weight of a monomer of formula (I):
b) 70% to 98% by weight of polyalkylene glycol,
c) 1% to 29% by weight of a polyisocyanate, and
d) 1% to 29% by weight of an aliphatic alcohol having between 6 and 20 carbon atoms other than the monomer of formula (I),
where the sum of these mass percentages is equal to 100%.

9. The polyurethane according to claim 8, resulting from the condensation of:
a) 1% to 29% by weight of a monomer of formula (I), where R designates an alkyl group having between 12 and 15 carbon atoms,
b) 70% to 98% by weight of a polyalkylene glycol,
c) 1% to 29% by weight of a polyisocyanate, and
d) 1% to 29% by weight of an aliphatic alcohol having between 10 and 15 carbon atoms other than the monomer of formula (I),
where the sum of these mass percentages is equal to 100%.

10. An aqueous composition comprising water and a polyurethane according to claim 1.

11. An aqueous composition according to claim 10, further comprising a surfactant.

12. An aqueous composition according to claim 10, further comprising an additive selected from the group consisting of a biocide, a solvent, an anti-foaming agent, a pH regulator, a coalescent agent and mixtures thereof.

13. An aqueous composition according to claim 10, comprising:
5% to 45% by weight of said polyurethane,
5% to 30% by weight of at least one surfactant,
25% to 75% by weight of water, and
0 to 5% by weight of an additive selected from the group consisting of a biocide, a solvent, an anti-foaming agent, a pH regulator, a coalescent agent and mixtures thereof,
where the sum of these mass percentages is equal to 100%.

14. An aqueous formulation comprising a polyurethane according to claim 1, wherein said formulation is selected from the group consisting of a paint, a lacquer, a varnish, a paper coating, a cosmetic formulation and a detergent formulation.

15. A method of thickening an aqueous formulation, where said formulation is selected from the group consisting of a paint, a lacquer, a varnish, a paper coating, a cosmetic formulation and a detergent formulation, comprising adding the aqueous composition of claim 10 to said aqueous formulation.

16. A method of preparation of a polyurethane according to claim 1, comprising condensing said monomer of formula (I), said polyalkylene glycol, and said polyisocyanate.

* * * * *